US006402877B1

(12) United States Patent
Bielfeldt

(10) Patent No.: US 6,402,877 B1
(45) Date of Patent: Jun. 11, 2002

(54) PROCESS FOR PRODUCING BOARDS MADE OF DERIVED TIMBER PRODUCTS OR LAMINATED VENEER BOARDS

(75) Inventor: Friedrich B. Bielfeldt, Paehl (DE)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 0 days.

(21) Appl. No.: 09/369,850

(22) Filed: Aug. 9, 1999

(30) Foreign Application Priority Data

Aug. 8, 1998 (DE) ........................................ 198 35 988

(51) Int. Cl.[7] ......................... B32B 31/10; B32B 31/14; B65H 29/66; B27D 1/06

(52) U.S. Cl. .................... 156/264; 156/266; 156/272.2; 156/275.7

(58) Field of Search .............................. 156/264, 272.2, 156/275.7, 379.6, 273.3, 556, 559, 580

(56) References Cited

U.S. PATENT DOCUMENTS 5,040,582 A * 8/1991 Hsu ........................... 156/255
5,892,208 A * 4/1999 Harris et al. ............. 156/272.2
5,895,546 A 4/1999 Bielfeldt et al. ......... 156/304.1
5,942,079 A 9/1999 Bielfeldt et al. ......... 156/379.8
6,004,648 A * 12/1999 Synder ....................... 156/256

FOREIGN PATENT DOCUMENTS

DE 197 18 771 5/1997
DE 196 27 024 1/1998

* cited by examiner

*Primary Examiner*—Jeff H. Aftergut
*Assistant Examiner*—Todd J. Kilkenny
(74) *Attorney, Agent, or Firm*—Foley & Lardner

(57) ABSTRACT

A process and an apparatus for producing endless laminated veneer boards from a veneer-panel strand comprising veneer panels laid together in a plurality of layers by means of gluing and compression in a heated, continuously operating press. The veneer-panel strand is run through a preliminary press with a preheating device before it enters the press. The preliminary press comprises a high-frequency or microwave-energy preheating device, the preheating device being adapted to focus energy and a reflection of said energy in a central region of veneer-panel strand.

10 Claims, 7 Drawing Sheets

PROCESS FOR PRODUCING BOARDS MADE OF DERIVED TIMBER PRODUCTS OR LAMINATED VENEER BOARDS

BACKGROUND OF THE INVENTION

1. Field of the Invention

The invention relates to a process and apparatus for producing boards made of derived timber products or laminated veneer boards.

2. Description of the Related Art

DE 197 18 772.2 (corresponding to U.S. patent application Ser. No. 09/071,778, filed May 4, 1998, which is hereby incorporated by reference) discloses a process by means of which disadvantages and problems associated with conventional preheating of wood products by means of high-frequency or microwave energy, such as an excessive duration of action, over-long energy-intensive preheating sections and penetration with the use of high-frequency or microwave energy, are resolved by adjusting the moisture content of the material to be compressed before it enters the press. The moisture content is adjusted in such a way that, while ensuring a significant reduction in the pressing factor, it is possible to ensure adequate transverse tensile strength within the pressing section or during the pressing time by increasing the preheating temperature of the material to be compressed to over 80° Celsius. The feeding and removal of the material to be compressed into the microwave device or from it, respectively, should be configured in such an optimum manner—the material to be compressed being preheated to over 80° Celsius within a short time—that the chemical reaction for curing the binder starts in the region of the press or after the start of compression.

This result is achieved, as regards the disclosure in DE 197 18 772.2, by the fact that the preheating of the core of the material to be compressed to greater than or equal to 85° Celsius takes place after or during the precompaction process by means of traveling-wave microwave energy and its reflection in an interaction, at the center of the material to be compressed, between the energy emitted and the energy reflected, focusing of the radiant energy in the central cross section being effected with a large energy-input and energy-absorption angle $\beta$ for an increased heating gradient, and the preheated mat of material to be pressed entering the pressing area of the press with a moisture content which is 15% to 30% lower than the conventional standard moisture content.

This solution provides the following advantages. Due to the effect of increased microwave energy density in the center of the material to be compressed, with the microwave energy that is not absorbed by the loose material being directed back into the center of the mat of material to be compressed by additional microwave reflector surfaces and control devices in a process involving the interaction of the energy emitted and the energy reflected and the focusing of the wave energy in the core of the mat, the preheating temperature in the core of the material to be compressed is achieved over a considerably shorter distance, approximately in a ratio of about 10:1 to the prior art. Since the heating gradient or energy input and energy absorption angle $\beta$ is significantly larger when the concentrated energy is introduced into the center of the board than the angle a with the conventional technique, a higher temperature level can be introduced in the core of the loosely deposited mat of material to be compressed using current testing techniques, more specifically, about 85° Celsius. Although the binder may start to cure prematurely within the short time it takes to reach 85° Celsius, the reaction time remaining until the mat enters the continuously operating press or until the beginning of the pressing cycle in a single- or multi-opening press is negligible.

The focusing of the traveling waves in the center of the mat of material to be pressed furthermore ensures that 85° Celsius in the core of the mat is reached within a very short time. Because of the focusing of the radiant energy in the center of the mat of material to be compressed, the cover-layer area receives less heat. However, when the material to be compressed is introduced into the press the heat energy still required at the outer edges is rapidly made up by the input of heat energy from outside, for example, from the heated steel belts, resulting ultimately in a further shortening of the pressing factor by about 50%, depending on the thickness of the material to be compressed. This is achieved by displacing the 100°-Celsius steam point in the center of the material to be compressed toward the start of the pressing section. Without preheating, this 100° Celsius steam point is at about 75% to 85% of the total pressed length. Because of the increased energy density, this 100°-Celsius steam point is displaced into the forward area of the pressing section, corresponding to about 35% to 50% of the pressing length or pressing time.

A process for producing laminated veneer boards has been disclosed in DE-A 196 27 024. This process is based on the object of combining laminated assemblies of large area veneer panels (or sheets) automatically and continuously with adequate mechanical connection so that, given the subsequent continuous pressing operation, the veneer-panel interlinking points have virtually the same physical strength properties in the finished laminated veneer boards as the laminated veneer boards produced according to the previous laminated veneer assemblies of sandwich construction. Thus, it is possible to produce laminated veneer boards of good quality if all the manufacturing or production parameters are matched to one another in an optimum manner and the apparatus operates accordingly. Problems arise, however, from the fact that the moisture content of the layers of glue on the surfaces of the veneer panels and the moisture content of the veneer panels themselves are either too low or too high. If the moisture content is too high, there is the risk that an air/vapor mixture will lead to the formation of vapor in capillaries, resulting in splits in the finished product. If the moisture content is too low, the strength properties of the laminated veneer boards are inadequate. With regards to process engineering, heat transfer to the center, as in the production of particle board and fiber board, is not possible in the course of vapor generation during the production of plywood or LVL boards because the veneer panels form a natural vapor barrier.

SUMMARY OF THE INVENTION

The object of the present invention is to indicate a process and an apparatus by which higher quality and, through a more rapid sequence, a higher throughput rate can be achieved in the production of laminated veneer boards, and by which the above-noted advantages of DE 197 18 772.2 can be exploited in the production of laminated veneer boards.

According to a first embodiment of the invention, a method of producing endless laminated veneer boards comprises the steps of: applying an adhesive to at least some of a plurality of veneer panels; assembling the plurality of veneer panels in a plurality of interlinking layers to form one or more cover-layer strands, each of the cover-layer strands having central panels and outer panels; combining one or more of the plurality of cover-layer strands to form a veneer-panel strand, the veneer-panel strand having outer layers and central layers; and preheating the veneer-panel strand at a central region of the veneer-panel strand, wherein the step of preheating further comprises focusing of energy and a reflection of the energy in the central region; and compressing the veneer-panel strand in a pressing area.

The step of preheating may include preheating the central region to greater than or equal to 85 degrees Celsius.

The step of focusing may effect a large energy-absorption angle.

The moisture content of at least one of the adhesive and the veneer panels is preferably greater at the central layers than at the outer layers The moisture content of at least one of the adhesive and the veneer panels is preferably about 7.8% for the central layers and about 6% for the outer layers.

During the step of assembling, direction of fibers in one of the plurality of layers of the veneer panels may be placed at a 90-degree offset to an adjacent layer.

An apparatus according to the present invention comprises: at least one adhesive applicator for applying adhesive to veneer panels; at least one veneer-panel laying device for interlinking layers of the veneer panels to form a cover-layer strand; a preliminary press comprising a high-frequency or microwave-energy preheating device, the preheating device being adapted to focus energy and a reflection of the energy in a central region of a veneer-panel strand; wherein a moisture content of at least one of the adhesive and the veneer panels is greater at the central layers than at the outer layers.

BRIEF DESCRIPTION OF THE DRAWINGS

Further advantageous measures and configurations of the subject matter of the invention will become apparent from the following description with reference to the drawings, in which.

DETAILED DESCRIPTION OF THE PREFERRED EMBODIMENTS

According to a first example of the invention, layers of glue applied to the veneer panels and/or the veneer panels for the center or for those of a central-layer strand themselves have a higher moisture content than the layers of glue and/or the veneer panels for the outer layers or the cover-layer strands. The veneer panels are each then assembled to give an upper and a lower cover-layer strand and, if required, a central-layer strand and combined to give a veneer-panel strand. Prior to entering the continuously operating press, the veneer-panel strand is passed through a preliminary press with a microwave or high-frequency preheating device, the heat input of which acts from the inside outward.

An apparatus for carrying out the process is arranged such that veneer-panel stacks containing veneer panels of different moisture contents are arranged, and dedicated glue application machines are provided for the veneer panels of the cover-layer strands and for the veneer panels of the central-layer strands, and a dedicated veneer-panel laying device is provided for each cover- and central-layer strand.

The advantage of the process is that the higher moisture setting in the center or central-layer strand relative to the outer-cover layer strands results in a higher temperature due to the focusing in the center and the increased wave resistance and hence to more rapid setting of the glue joints, allowing a higher production speed to the achieved, given, that is, heating of the veneer-panel strand from the inside outwards.

Figure 1:
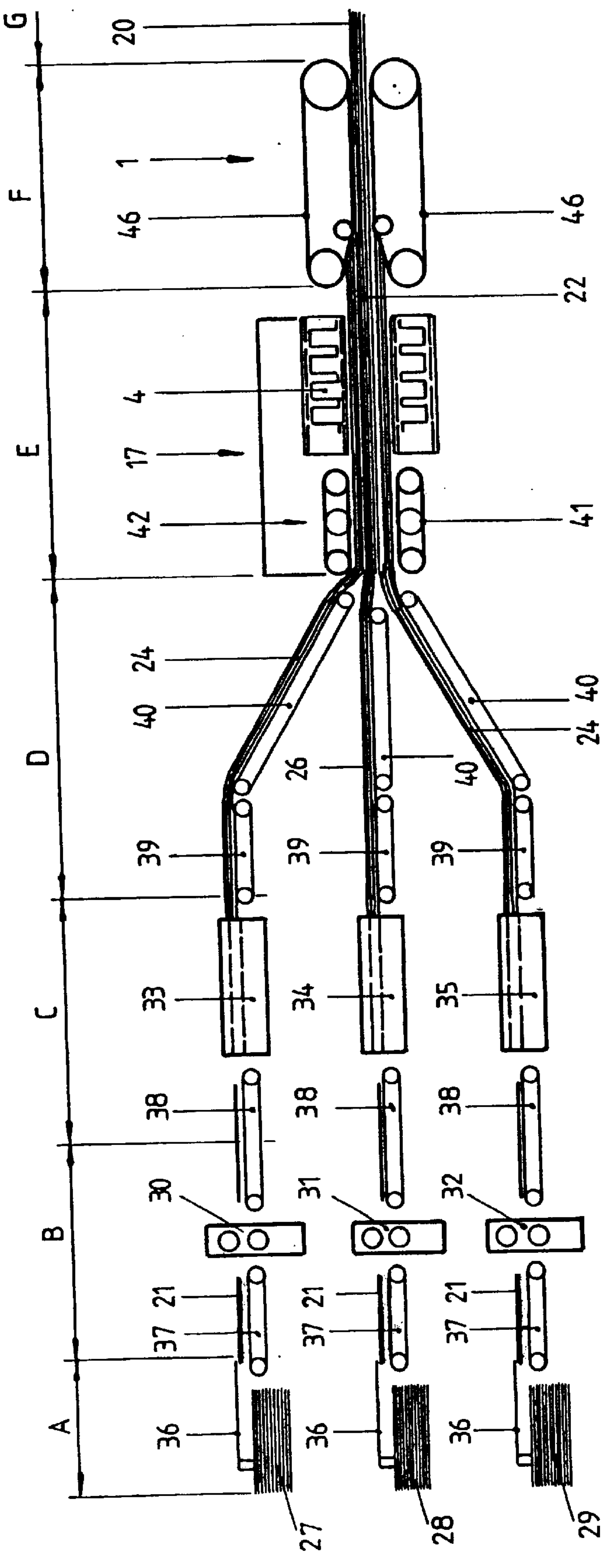
FIG. 1 shows the plant according to the invention for carrying out the process according to the invention, in side view.

FIG. 1 shows an overall perspective view of an apparatus according to the invention. According to the division of the plant along its length as shown in FIG. 1, the plant sections have the following significance:

| | |
|---|---|
| A | Veneer panel stack with removal device; |
| B | Veneer-panel gluing device; |
| C | Veneer-panel laying and interlinking device; |
| D | Veneer-assembly combining system; |
| E | Preliminary press with preheating device; |
| F | Continuously operating press; and |
| G | Outlet for laminated veneer boards (finishing). |

Section A

Veneer panels 21 with different moisture contents are stored on the veneer-panel stacks 27, 28 and 29 and are fed onto feed belts 37 by means of removal devices 36. In this arrangement, the veneer-panel stacks 27 and 29 are provided for the upper and lower cover-layer strands 24, respectively, and veneer-panel stack 28 is provided for the central-layer strand 26. For this purpose, the veneer panels 21 are stacked on the veneer-panel stacks 27 and 29 for the cover-layer strands 24 with lower moisture contents and on the veneer-panel stack 28 for the central-layer strand 26 with higher moisture contents.

Section B

Figure 3:
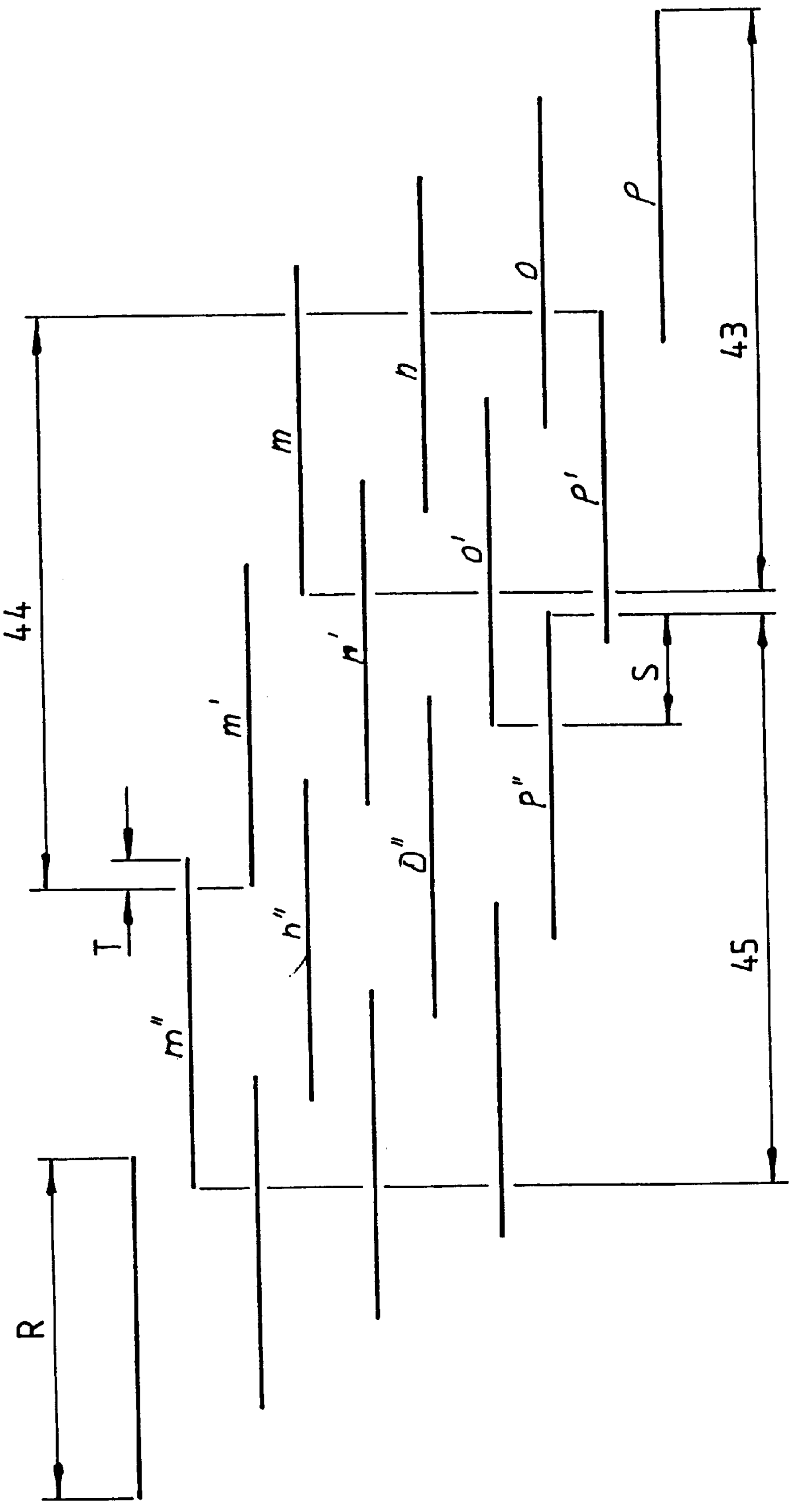
FIG. 3 shows the structure of the veneer assembly with the veneer panel length, veneer panel projection and veneer panel overlap.

The veneer-panels 21 comprising veneer sheets with thicknesses of, for example, from 1 mm to about 4.6 mm, and planar dimensions of, for example, 4'×8' or 3'×6' (about 0.8 m×2.4 m) run at high speed through the glue applicators 30, 31 and 32 from the veneer-panel stacks 27, 28 and 29 and are fed to the transfer belts 38. Only the top side of the veneer panels 21 is glued, allowing them to be transported easily through the whole of plant section B and up to and including plant section F on the belts and roller tables. Only the top veneer panel m (as shown in FIG. 3) of each veneer assembly 43, 44 or 45 for the upper cover-layer strand 24 is not glued. Adhesion is in each case ensured by gluing the veneer panel n underneath. The layer structure of a strand is recorded numerically as it passes through sections A, B, C and D by counting the veneer panels 21 in an appropriate manner in the lead-up to the glue applicators 30, 31 and 32. Like the veneer panels 21 from the individual veneer-panel stacks 27, 28 and 29, the glue in the individual glue applicators 30, 31 and 32 is adjusted to give different moisture contents to match the veneer panels 21. However, it is also possible for the moisture contents of the veneer panels 21 and of the glue layers to be applied to be adjusted so that, as the veneer panels 21 run through continuously, the individual glue applicators 30, 31 and 32 are engaged or released in terms of the application of the glue rolls to the surfaces of the veneer panels, this being done under numerical control such that the moisture content of the glue is matched to the moisture content of the veneer panels 21.

Section C

The way in which the veneer panels 21 are fed in, assembled and combined in the veneer panel laying devices 33, 34 and 35 is disclosed in accordance with DE-A 196 27 024.

FIG. 3 shows the interlinked or interleaved structure of the veneer panels 21 to give a number of veneer assemblies 43, 44 and 45 and the cover-layer strands 24 or the central-layer strand 26. The individual veneer panels 21 are stuck mechanically by the veneer overlap T after interleaving to give the corresponding veneer panels m, n, o, p of a veneer assembly 43, 44 and 45. The constant operating speed and the identical geometric positions of the veneer panel length R, veneer panel projection S and veneer panel overlap T here result in the same veneer assembly configuration in every case, i.e., the fixing of the veneer panels 21 relative to one another in the strand of assemblies.

The veneer panels 21 in the veneer-panel laying devices 33, 34 and 35 are laid layer by layer in line with the direction of the wood fibers, in the direction of transport and in the same direction for each veneer-panel layer. Increased bending strength can be achieved if, when laying the individual veneer panels 21 one on top of the other, the direction of the fibers from one veneer panel 21 to the other or from layer to layer is different. In other words, the veneer panels 21 may be aligned before being laid one on top of the other and interleaved in the veneer-panel laying devices 33, 34 and 35, or, if required, fed in from the veneer-panel stacks 27, 28 and 29. Thus, for example, all veneer panels 21 in one layer plane are laid with their wood fibers in the direction of transport, whereas all the veneer panels 21 in the layer plane below are laid with their wood fibers at 90° to the direction of transport.

Sections D and E

The continuously formed cover-layer strands 24 and the central-layer strand 26 are taken over by the supporting belts 39 and fed to the combining belt 41 by way of laying belts 40. As can be seen in FIG. 1, the preliminary press 17 comprises an inlet roller frame 42 with integral preheating, which can be produced by a UHF or microwave field.

Figure 2:
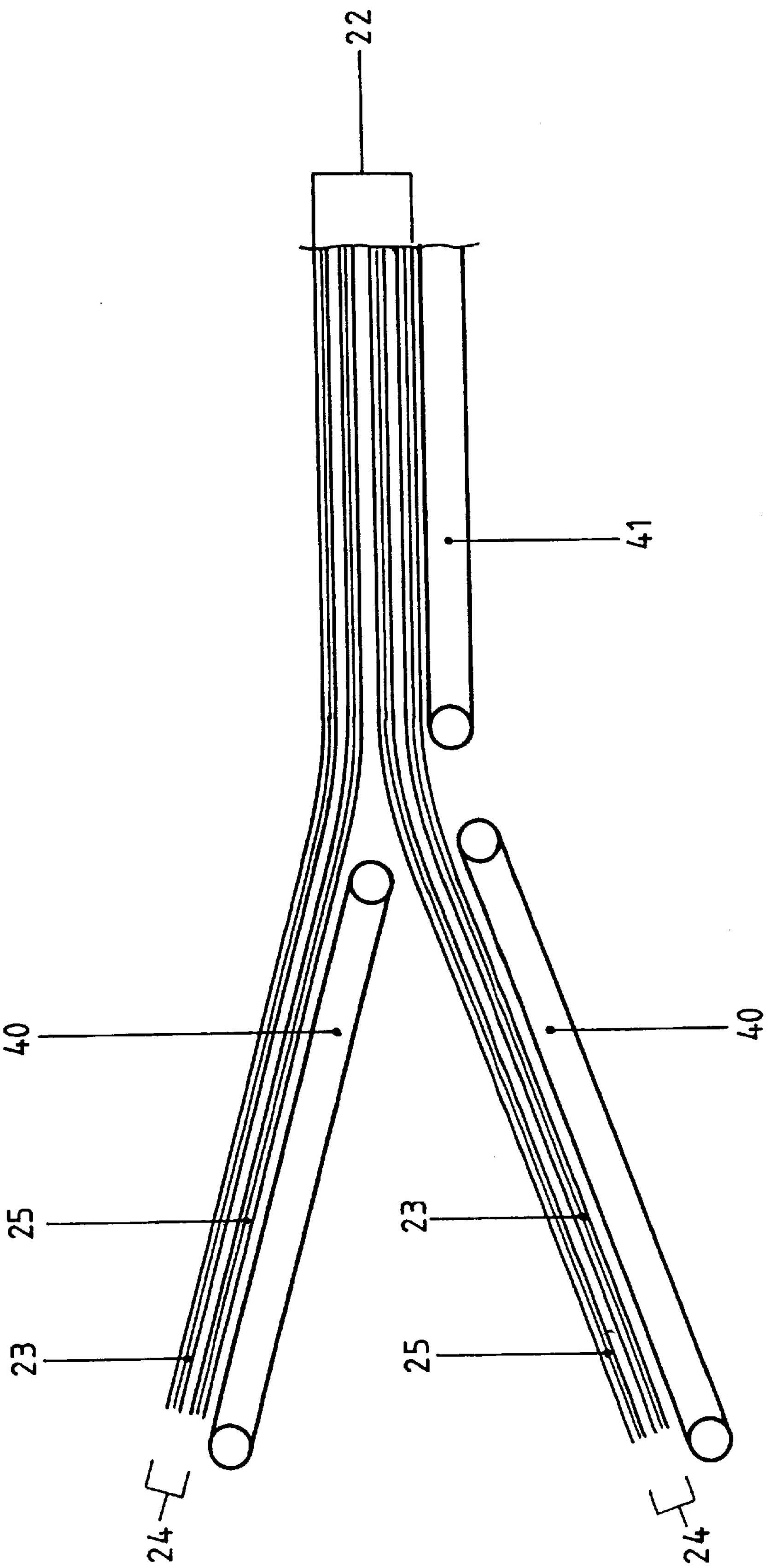
FIG. 2 shows two cover-layer strands of different moisture contents being brought together on an enlarged scale.

FIG. 2 shows in longitudinal section how, in the two-strand method, a double veneer-panel strand 22 comprising two cover-layer strands 24 is formed and fed by means of the combining belt 41 to the preliminary press 17. The cover-layer strands 24 comprise veneer panels 21 and layers of glue of differing moisture content between the outer layer 23 and central layers 25. As can also be seen in FIG. 1, the preliminary press 17 comprises an inlet roller frame 42 with integral preheating, which can be produced by a UHF or microwave field.

Figure 4:
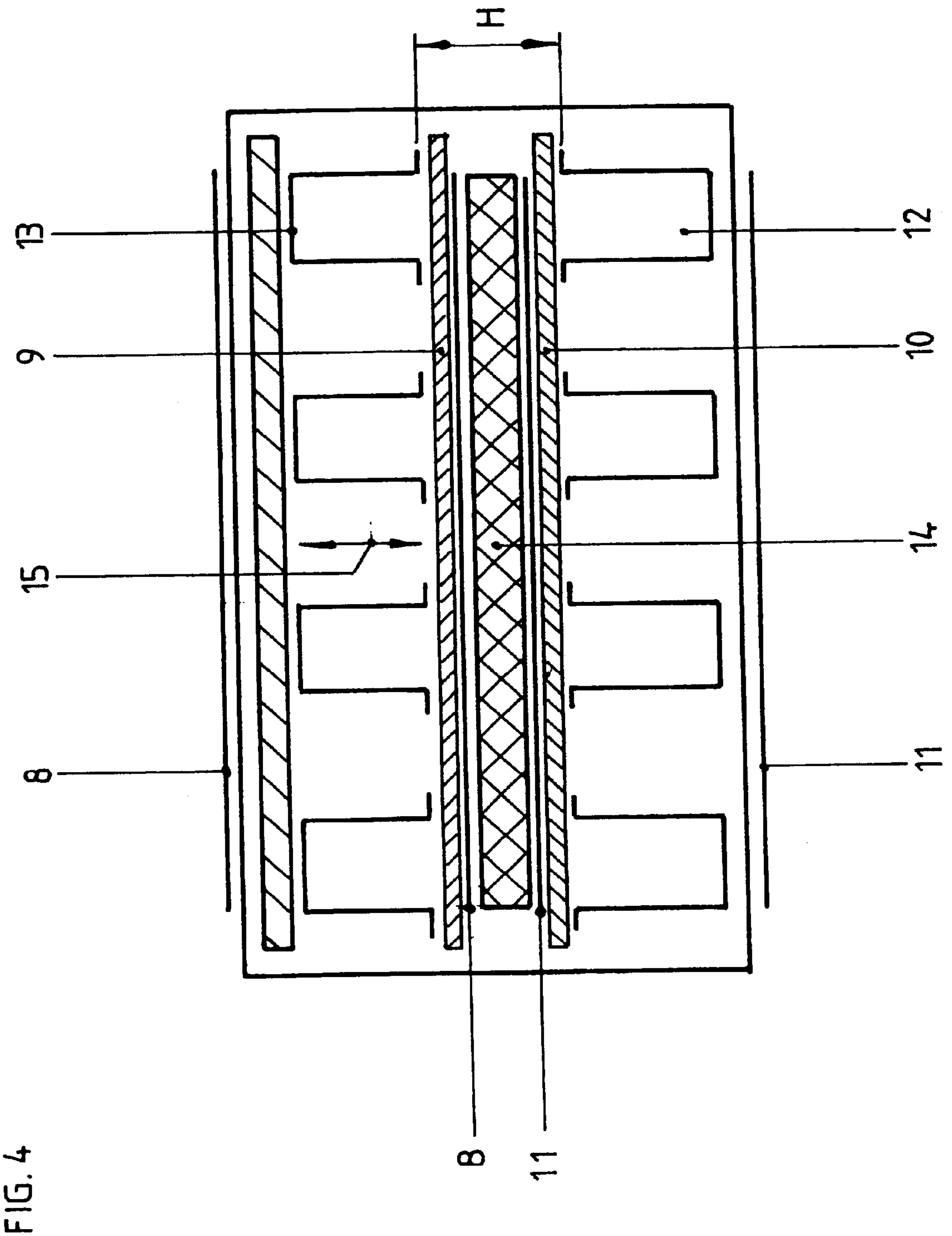
FIG. 4 shows a section IV—IV according to FIG. 1.

FIG. 4 shows, in a section IV—IV through the microwave preheating device 4, the arrangement of the revolving plastic loop belts 8 (top) and 11 (bottom) relative to the material 14 to be compressed and the generators 12 and reflectors 13. More specifically, the upper plastic belt 8 accompanies the upper surface of the material to be compressed and plastic belt 11 accompanies the lower surface of the material to be compressed. Both plastic belts 8 and 11 are guided at a distance of about 20 mm from the reflectors 13 and the generators 12 by nonconductive boundary plates 9 and 10 designed as sliding-contact plates. The distance H between the generators 12 and the reflectors 13 within the microwave preheating device 4 is greater than the thickness of the material 14 to be compressed. As the plastic belts 8 and 11 pass through with the material 14 to be compressed, these plastic belts 8 and 11 slide between the boundary plates 9 and 10. The distance H is adjusted by means of an adjusting device 15 within the clearance between the reflectors 13 and the generators 12. The preheated laminated veneer panel strand is enclosed at the top and bottom by the plastic belts 8 and 11 until just before the steel belts 46 of the continuously operating press 1, thus avoiding heat losses due to radiation or losses due to drying out.

Figure 5:
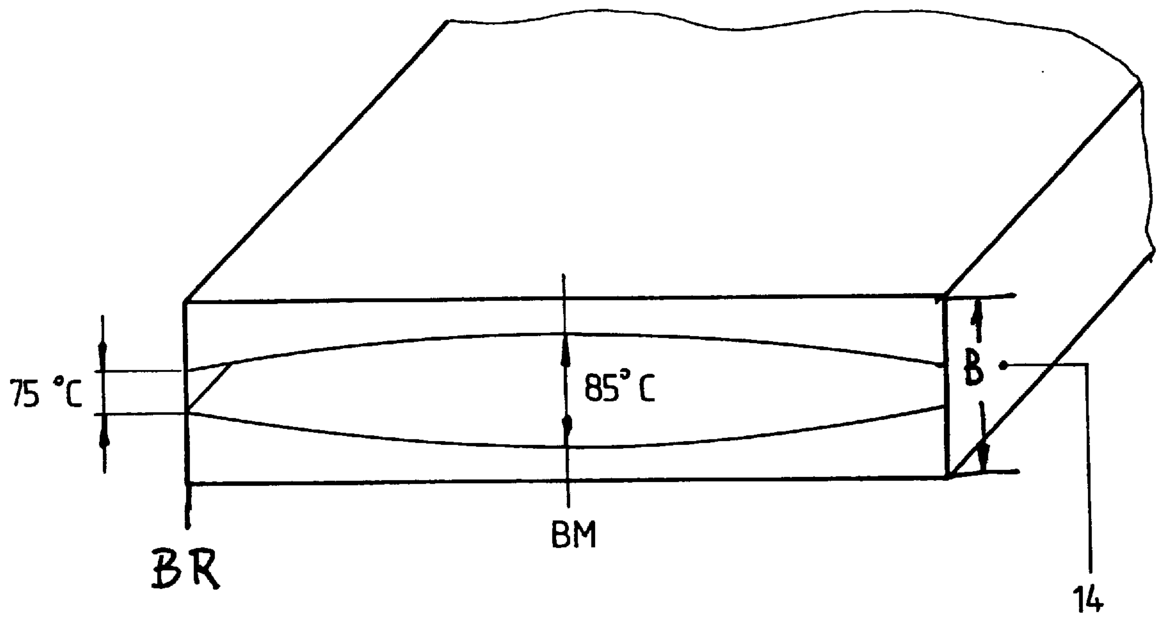
FIG. 5 shows the cross section of the mat of material to be compressed, with increased heat input in the center.

FIG. 5 shows the cross section with thickness B of the veneer-panel strand 22 in the case of increased heat input by the generators 12 and reflectors 13 to the cross-sectional center and a falling temperature profile, for example, from the center at 85° to the edges at 75° Celsius. This enables better de-vaporization from the center $B_M$ to the edge $B_R$ of the veneer-panel strand 22, in accordance with the vapor pressure drop.

Figure 6:
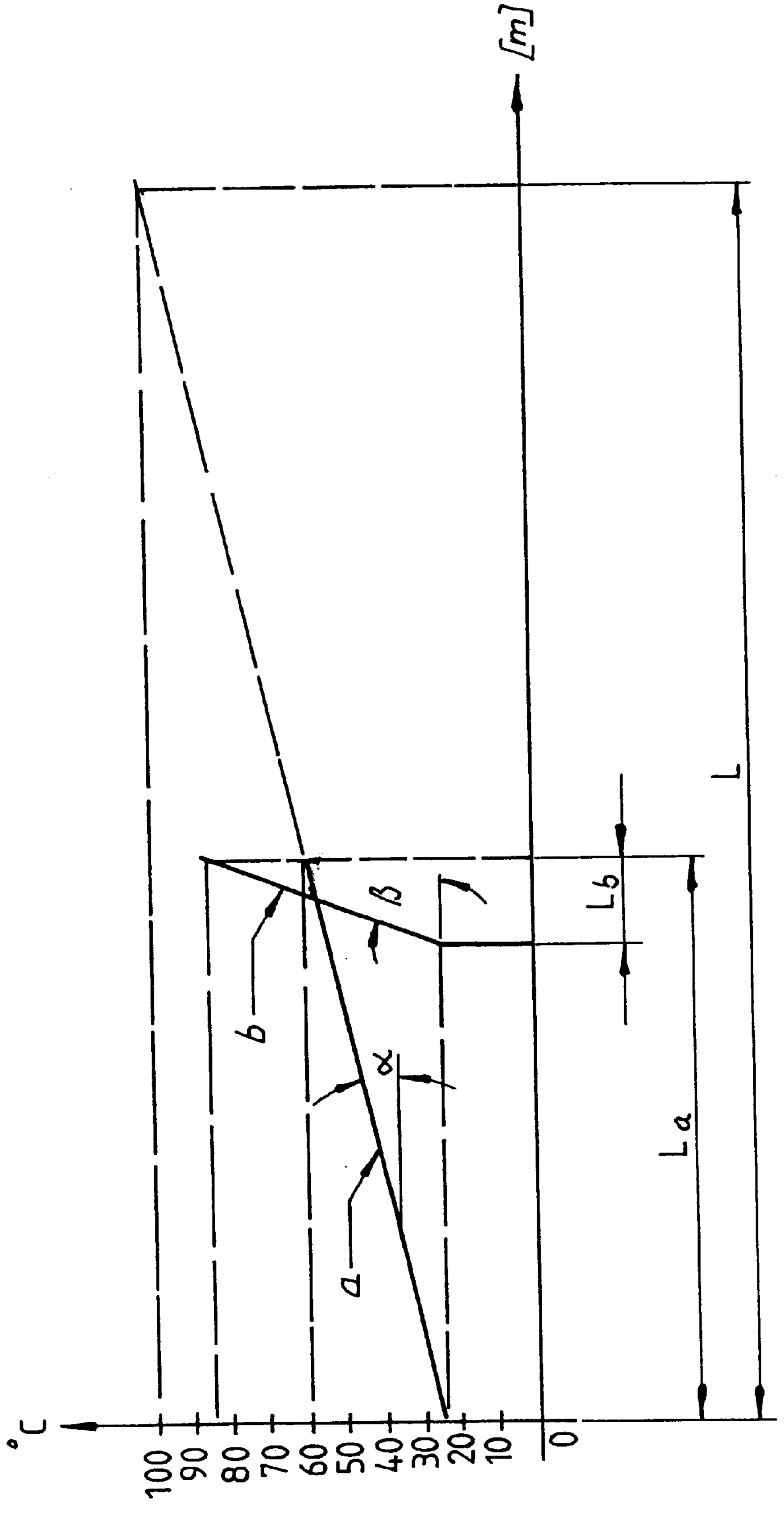
FIGS. 6 and 7 show diagrams illustrating the microwave heat and time profile.

In FIG. 6, L indicates the overall pressing distance, or pressing time, $L_a$ indicates the conventional preheating distance or time, and $L_b$ indicates the effective distance or time in the case of HF or microwave preheating with focused traveling-wave microwave energy density in accordance with the invention in the center of the material 14 to be compressed. The graph also indicates the useful preheating distance in terms of degrees Celsius, the angle $\alpha$ indicating the conventional energy input and energy absorption angle and the angle $\beta$ indicating the short and rapid energy input and energy absorption angle that is possible in accordance with the invention.

Figure 7:
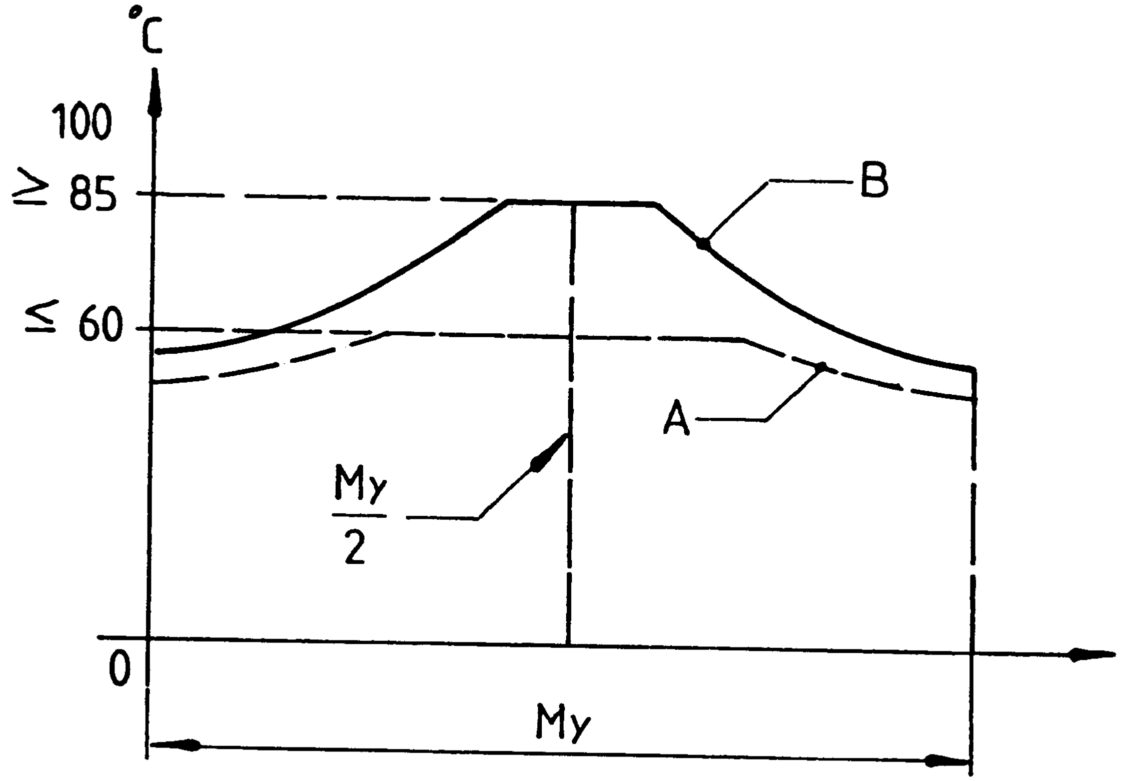

FIG. 7 gives a comparative indication of the heat input across the width $M_Y$ of the veneer-panel strand 22, curve A indicating the previous temperature input through the cross section and curve B showing the temperature input according to the invention, through the cross section.

Section F

This section comprises a continuously operating press 1 used for gluing and compressing the veneer panel strand 22. The revolving steel belts 46 at the top and bottom are supported relative to the heated compression/heating plates by means of rolling rods, if required.

The continuously operating press 1 chosen as an embodiment example to illustrate the invention has been chosen arbitrarily and is designed as a double-belt press with revolving steel belts and heatable compression/heating plates (not shown). The invention could also be described with reference to a single- or multiple-opening press and be used in conjunction with such a press.

The microwave preheating device 4 is arranged directly ahead of the incoming steel belts of the continuously operating press 1. When required, depending on the end product planned, a steam feed device can be provided between the outlet of the microwave preheating device 4 and the oblique steel-belt inlet guide.

Section G

After leaving the continuously operating press 1, the continuously emerging endless laminated veneer board 20 is fed to final finishing. For example, the endless laminated veneer board 20 may be divided into appropriate structural elements, beams and supporting elements for the construction of prefabricated houses.

An additional advantage of the invention is in the optimum introduction of the microwave energy with an efficiency of over 90% to obtain controlled focusing in the core region of the veneer-panel strand. Additionally, the microwave generators and reflectors are arranged close to the surface of the material to be pressed, leaving a gap of less than 20 mm. Thus, the veneer-panel strand is passed in a controlled manner between the microwave generators and reflectors and, after preheating, is fed to the press immediately after leaving the microwave device, without heat loss (radiant heat loss), the aim being to achieve an optimum plant in terms of energy use.

The foregoing description of the preferred embodiments of the invention has been presented for purposes of illustration and description. It is not intended to be exhaustive or to limit the invention to the precise form disclosed, and modification and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The priority application here, German patent application No. 198 35 988.8, filed Aug. 8, 1998, is hereby incorporated by reference. Also, U.S. patent application Ser. No. 09/369, 847, filed Aug. 9, 1999, and corresponding to German patent application No. 198 35 946.2, is hereby incorporated by reference.

I claim:

1. A method of producing endless laminated veneer boards comprising the steps of:

applying an adhesive to at least some of a plurality of veneer panels;

assembling said plurality of veneer panels in a plurality of interlinking layers to form one or more cover-layer strands, each of said cover-layer strands having central panels and outer panels;

combining one or more of said plurality of cover-layer strands to form a veneer-panel strand, said veneer-panel strand having outer layers and central layers wherein a moisture content of at least one of the adhesive and the veneer panels is greater at the central layers than at the outer layers; and preheating said veneer-panel strand at a central region of said veneer-panel strand, wherein said step of preheating further comprises:

focusing of energy and a reflection of said energy in said central region; and compressing said veneer panel strand in a pressing area.

2. The method according to claim 1, wherein said step of preheating includes preheating said central region to greater than or equal to 85 degrees Celsius.

3. The method according to claim 1, wherein said step of focusing effects a large energy-absorption angle.

4. The method according to claim 1, wherein said moisture content of at least one of the adhesive and the veneer panels is about 7.8% for said central layers and about 6% for said outer layers.

5. The method according to claim 1, wherein, during said step of assembling, direction of fibers in one of said plurality of layers of the veneer panels are placed at a 90 degree offset to an adjacent layer.

6. The method according to claim 1, wherein said central panels are located at or adjacent to a geometric point constituting the center of the veneer panel strand.

7. The method according to claim 5, wherein the moisture content of at least one of the adhesive and the veneer panels is adjusted prior to assembly to be greater at the central layers than at the outer layers.

8. The method according to claim 5, wherein said moisture content of at least one of the adhesive and the veneer panels is about 7.8% for said central layers and about 6% for said outer layers.

9. A method of producing endless laminated veneer boards comprising the steps of:

applying an adhesive to at least some of a plurality of veneer panels;

assembling said plurality of veneer panels in a plurality of interlinking layers to form one or more cover-layer strands, wherein during said step of assembling, one of said plurality of layers of the veneer panels is placed so that the direction of its fibers is different than the direction of the fibers in an adjacent layer, each of said cover-layer strands having central panels and outer panels;

combining one or more of said plurality of cover-layer strands to form a veneer-panel strand, said veneer-panel strand having outer layers and central layers wherein a moisture content of at least one of the adhesive and the veneer panels is adjusted prior to assembly to be greater at the central layers than at the outer layers; and preheating said veneer-panel strand at a central region of said veneer-panel strand, wherein said step of preheating further comprises:

focusing of energy and a reflection of said energy in said central region; and compressing said veneer panel strand in a pressing area.

10. The method according to claim 9, wherein during said step of assembling, one of said plurality of layers of the veneer panels is placed so that the direction of its fibers forms a 90 degree angle in relation to the direction of the fibers in an adjacent layer.

* * * * *